(12) United States Patent
Wang et al.

(10) Patent No.: US 12,542,875 B2
(45) Date of Patent: Feb. 3, 2026

(54) HYBRID ARCHITECTURE OF BIRDS-EYE VIEW FEATURES AND PIXELS FOR AUTONOMOUS DRIVING PERCEPTION

(71) Applicant: CONNAUGHT ELECTRONICS Ltd., Tuam (IE)

(72) Inventors: Lihao Wang, Bietigheim-Bissingen (DE); Xinhua Xiao, Bietigheim-Bissingen (DE); Thomas Heitzmann, Bietigheim-Bissingen (DE); Deep Doshi, Bietigheim-Bissingen (DE); Rachid Benmokhtar, Bietigheim-Bissingen (DE); Sree Harsha Chowdary Gorantla, Bietigheim-Bissingen (DE)

(73) Assignee: CONNAUGHT ELECTRONICS Ltd., Tuam (IE)

( * ) Notice: Subject to any disclaimer, the term of this patent is extended or adjusted under 35 U.S.C. 154(b) by 226 days.

(21) Appl. No.: 18/405,588

(22) Filed: Jan. 5, 2024

(65) Prior Publication Data
US 2025/0227205 A1     Jul. 10, 2025

(51) Int. Cl.
*G06V 10/77* (2022.01)
*B60W 50/06* (2006.01)
(Continued)

(52) U.S. Cl.
CPC ............ *H04N 7/181* (2013.01); *B60W 50/06* (2013.01); *B60W 50/14* (2013.01);
(Continued)

(58) Field of Classification Search
CPC ...... H04N 7/181; H04N 5/2628; H04N 5/265; G06T 7/292; G06T 7/248; G06T 19/00;
(Continued)

(56) References Cited

U.S. PATENT DOCUMENTS 10,373,323 B1    8/2019  Kim et al.
11,100,366 B2    8/2021  Roy Chowdhury et al.
(Continued)

FOREIGN PATENT DOCUMENTS

WO    WO-2024227677 A1 * 11/2024 ........... G06T 3/4038

*Primary Examiner* — Kenneth M Dunne
(74) *Attorney, Agent, or Firm* — Osha Bergman Watanabe & Burton LLP

(57) ABSTRACT

A method includes obtaining image frames from each camera disposed along a vehicle, where each image frame corresponds to a same timestamp. The method further includes constructing a first birds-eye view (BEV) image from each image frame with a first BEV module and constructing a second BEV image from each image frame by Inverse Perspective Mapping (IPM) with a second BEV module. The first BEV module extracts features of an external environment of the vehicle from each image frame, transforms the features to a three-dimensional space, and projects the three-dimensional space onto an overhead two-dimensional plane. Subsequently, a merging module merges the first and second BEV images to produce a hybrid BEV image. Features of an external environment of the vehicle within the hybrid BEV image are detected by a deep learning neural network and the hybrid BEV image is displayed to a user in the vehicle.

20 Claims, 8 Drawing Sheets

(51) Int. Cl.
- *B60W 50/14* (2020.01)
- *B60W 60/00* (2020.01)
- *G06T 7/246* (2017.01)
- *G06T 7/292* (2017.01)
- *G06T 19/00* (2011.01)
- *G06V 10/82* (2022.01)
- *G06V 20/58* (2022.01)
- *G06V 20/70* (2022.01)
- *H04N 5/262* (2006.01)
- *H04N 5/265* (2006.01)
- *H04N 7/18* (2006.01)

(52) U.S. Cl.
CPC ........... *B60W 60/001* (2020.02); *G06T 7/248* (2017.01); *G06T 7/292* (2017.01); *G06T 19/00* (2013.01); *G06V 10/7715* (2022.01); *G06V 10/82* (2022.01); *G06V 20/58* (2022.01); *H04N 5/2628* (2013.01); *H04N 5/265* (2013.01); *B60W 2420/403* (2013.01); *G06T 2207/20221* (2013.01); *G06T 2207/30241* (2013.01); *G06T 2207/30252* (2013.01); *G06V 20/70* (2022.01)

(58) Field of Classification Search
CPC ...... G06T 2207/20221; B60W 60/001; B60W 50/06; B60W 50/14; B60W 2420/403; G06V 20/58; G06V 20/70
See application file for complete search history.

(56) References Cited

U.S. PATENT DOCUMENTS

| | | |
|---|---|---|
| 11,205,095 B2 | 12/2021 | Roy Chowdhury et al. |
| 11,615,605 B2 | 3/2023 | Ye et al. |
| 2022/0080999 A1 | 3/2022 | Vora et al. |
| 2022/0114764 A1 | 4/2022 | Beijbom et al. |
| 2023/0071437 A1 | 3/2023 | Kim et al. |
| 2023/0230385 A1* | 7/2023 | Tananaev ............... G06V 10/44 348/148 |

\* cited by examiner

HYBRID ARCHITECTURE OF BIRDS-EYE VIEW FEATURES AND PIXELS FOR AUTONOMOUS DRIVING PERCEPTION

BACKGROUND

Motor vehicles are commonly provided with multi-camera automotive vision systems that include a number of cameras disposed along the front, rear, and/or side portions of the vehicle for capturing images of the surrounding environment. Images captured by these cameras are typically relayed to an image processing device that, among various tasks, processes the images. The image processing device generates processed images such that the environment of the vehicle is represented from a predetermined target perspective, which is a process referred to as "perspective mapping."

That is, the respective input images of the multiple cameras, each of which depicting a predetermined subarea of the environment of the vehicle, may be newly mapped in an overall representation for this purpose by selecting and combining the individual camera images together. Thus, a composite image may be created as a new overall image, which represents a view of the environment of the motor vehicle from the predetermined target perspective. For example, the predetermined target perspective of the environment of the vehicle within the new overall image may be a top view representation with the vehicle being arranged in the center of the image. Such a top view representation may alternatively be referred to as a "birds-eye view" (BEV) perspective.

The representation of the environment from the BEV perspective or another predetermined target perspective may further be displayed to a user of the vehicle on a display within the vehicle. In this way, the user's understanding of the vehicle within the environment may be improved, particularly during critical driving maneuvers such as parking maneuvers. Further, the processed images may also be utilized for obstacle detection during autonomous or semi-autonomous vehicle operations, which is useful during processes like autonomous lane switching, for example.

SUMMARY

One or more embodiments of the present invention relate to a method that includes obtaining an image frame from each camera of a plurality of cameras disposed along a vehicle, where each image frame corresponds to a same timestamp. The method further includes constructing, with a first birds-eye view (BEV) module, a first BEV image from each image frame and constructing, with a second BEV module, a second BEV image from each image frame by Inverse Perspective Mapping (IPM). Subsequently, a merging module merges the first BEV image and the second BEV image to produce a hybrid BEV image. The first BEV module is designed to extract features of an external environment of the vehicle from each image frame, transform the features extracted from a two-dimensional space to a three-dimensional space, and perform a view transformation by projecting the three-dimensional space onto an overhead, two-dimensional plane. The method also includes detecting, with a deep learning neural network, features of an external environment of the vehicle within the hybrid BEV image and displaying the hybrid BEV image to a user disposed within the vehicle.

In addition, one or more embodiments of the present invention relate to a non-transitory computer readable medium that stores instructions executable by one or more processors of a Central Processing Unit (CPU). The instructions include functionality for obtaining an image frame from each camera of a plurality of cameras disposed along a vehicle, where each image frame corresponds to a same timestamp. The instructions further include functionality for constructing, with a first BEV module, a first BEV image from each image frame, and constructing, with a second BEV module, a second BEV image from each image frame by IPM. Subsequently, a merging module merges the first BEV image and the second BEV image to produce a hybrid BEV image. The first BEV module is designed to extract features of an external environment of the vehicle from each image frame, transform the features extracted from a two-dimensional space to a three-dimensional space, and perform a view transformation by projecting the three-dimensional space onto an overhead, two-dimensional plane. The instructions also include functionality for detecting, with a deep learning neural network, features of an external environment of the vehicle within the hybrid BEV image and displaying the hybrid BEV image to a user disposed within the vehicle.

One or more embodiments of the present invention relate to a system that includes a vehicle, a plurality of cameras disposed along the vehicle, a deep learning neural network, and a CPU. The CPU includes one or more computer processors and a non-transitory computer readable medium that stores instructions that are executable by the one or more processors. The instructions include functionality for obtaining an image frame from each camera of the plurality of cameras corresponding to a same timestamp. The instructions further include, constructing, with a first BEV module, a first BEV image from each image frame, and constructing, with a second BEV module, a second BEV image from each image frame by IPM. Subsequently, a merging module merges the first BEV image and the second BEV image to produce a hybrid BEV image. The first BEV module is designed to extract features of an external environment of the vehicle from each image frame, transform the features extracted from a two-dimensional space to a three-dimensional space, and perform a view transformation by projecting the three-dimensional space onto an overhead, two-dimensional plane. The instructions also include functionality for detecting, with the deep learning neural network, features of an external environment of the vehicle within the hybrid BEV image and displaying, via a dashboard of the vehicle, the hybrid BEV image to a user disposed within the vehicle.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. To maintain consistency, identical elements in different figures are identified by matching reference numerals. The sizes and relative positions of elements in the drawings are not necessarily drawn to scale. For example, the shapes and angles of various elements may deviate from precise proportions, and certain elements might be intentionally enlarged or repositioned for the sake of improving drawing legibility.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description. Thus, this disclosure intends to strike a balance between providing sufficient detail for clarity purposes and avoiding superfluous intricacies.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed towards systems and methods useful for generating a hybrid birds-eye image (BEV). In addition, the techniques discussed in this disclosure advantageously allow for the detection features of an external environment of a vehicle with a nominal height such as parking slots and lane markings.

Figure 1:
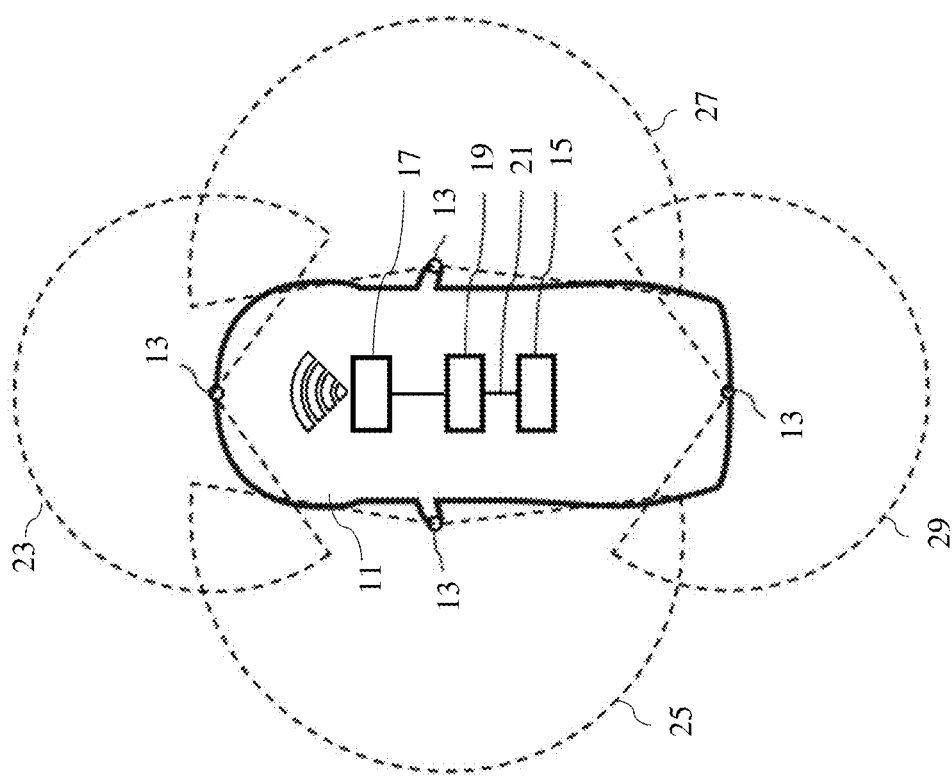
FIG. 1 shows a system in accordance with one or more embodiments disclosed herein.

FIG. 1 depicts an example of a vehicle 11 in accordance with one or more embodiments disclosed herein. As shown in FIG. 1, a vehicle 11 includes a plurality of cameras 13 and a Central Processing Unit (CPU) 15. In addition, the vehicle 11 may further include a navigational sensor 17 and/or a dashboard 19. Components of the vehicle 11 are interconnected through the use of a bus 21, which is at least one wire, wiring harness, and/or connector that serve to transmit data throughout the vehicle 11. In one or more embodiments, the CPU 15, the plurality of cameras 13, and the bus 21 are collectively part of an Advanced Driver Assistance System (ADAS), which is further discussed in relation to FIG. 7.

The plurality of cameras 13 are designed to visually perceive and collect quantitative data associated with the external environment of the vehicle 11. In one or more embodiments, each camera of the plurality of cameras 13 captures data associated with the external environment through images or a video feed. In FIG. 1, a front-facing camera, two side-facing cameras, and a rear-facing camera are disposed along the exterior of vehicle 11. However, the number of cameras 13 disposed on the vehicle 11 and the location of the cameras 13 is not limited to the example depicted in FIG. 1. In other embodiments, one or more cameras 13 may be disposed within the interior of the vehicle 11, and more or less cameras 13 may be used than shown in FIG. 1. For example, in one or more embodiments, a single camera 13 (or a system of cameras 13) with surround view capabilities (such as a stereo camera) may be disposed on the vehicle 11 (e.g., on the top of the vehicle 11).

In general, each camera 13 disposed on a vehicle 11 is relatively small compared to the vehicle 11. As such, due to the relatively small size of a camera 13, a camera 13 may be disposed on the vehicle 11 so that it is generally unnoticeable and does not hinder any functionality of the vehicle 11. Further, each camera of the plurality of cameras 13 may be concealed (e.g., tucked under a piece of trim), and ruggedized (i.e., able to withstand vibrations, operational through a wide range of temperatures, waterproof, etc.). In one or more embodiments, one or more of the cameras 13 may be outfitted with a fisheye lens. In other embodiments, one or more of the cameras 13 disposed along the vehicle 11 may be a pin-hole (i.e., conventional) camera. Other camera lens types may be used in one or more of the cameras 13 without departing from the nature of this disclosure.

Generally, cameras such as the depicted cameras 13 provide a field of view (FOV). FOV is used herein as a general term intended to indicate the extent of the observable world that is seen by a camera 13. From a technical standpoint, the FOV is region of the external environment in which the detector of a camera 13 is capable of detecting electromagnetic radiation. The FOV of each of the four cameras 13 disposed on the vehicle 11 depicted in FIG. 1 is shown with a dashed closed curve. The front-facing camera has a front-facing FOV 23 such that the front-facing camera may acquire images of the environment in front of the vehicle 11. Likewise, the side-facing cameras are associated with either the left-facing FOV 25 or right-facing FOV 27, where the terms "left" and "right" are relative to the top-down view of the vehicle 11 shown in FIG. 1. Finally, the rear-facing camera has a rear-facing FOV 29 such that the rear-facing camera may acquire images of the environment to the rear of the vehicle 11.

As depicted in FIG. 1, the respective FOVs of the cameras 13 partially overlap such that the entire surrounding environment of the vehicle 11 is captured by the plurality of cameras 13. In other words, a set of images acquired by the plurality of cameras 13 at a given instant in time can be said to capture the entire surroundings of the vehicle 11 at that time. Furthermore, some objects may be disposed in an overlapped portion of the FOVs of the cameras 13, such that a single object may be detected by two or more cameras 13. Indeed, in cases where a vehicle 11 is driving alongside a particularly lengthy object, the object may be present in front of, to the side of, and behind the vehicle 11 at a single instant in time, such that the object is present in 3 distinct FOVs. As previously stated, in one or more embodiments, the entire surrounding environment of the vehicle 11 may be captured using a camera system of one or more cameras 13 disposed on top of the vehicle 11.

Continuing with the non-limiting example of FIG. 1, it is noted that the placement of the plurality of cameras 13 disposed along the vehicle 11 (e.g., the height of each camera 13 relative to the ground) may directly affect the FOVs of the plurality of cameras 13 and the visibility of objects within the external environment in the vicinity of the vehicle 11. One with ordinary skill in the art will appreciate that the height of each camera 13 disposed along the vehicle 11 may be adjusted and/or selected to optimize the view of each camera 13 without departing from the scope of this disclosure. Further, the plurality of cameras 13 may be placed such that any viewpoint(s) of the plurality of cameras 13 are not hindered by the vehicle 11.

Figure 2:
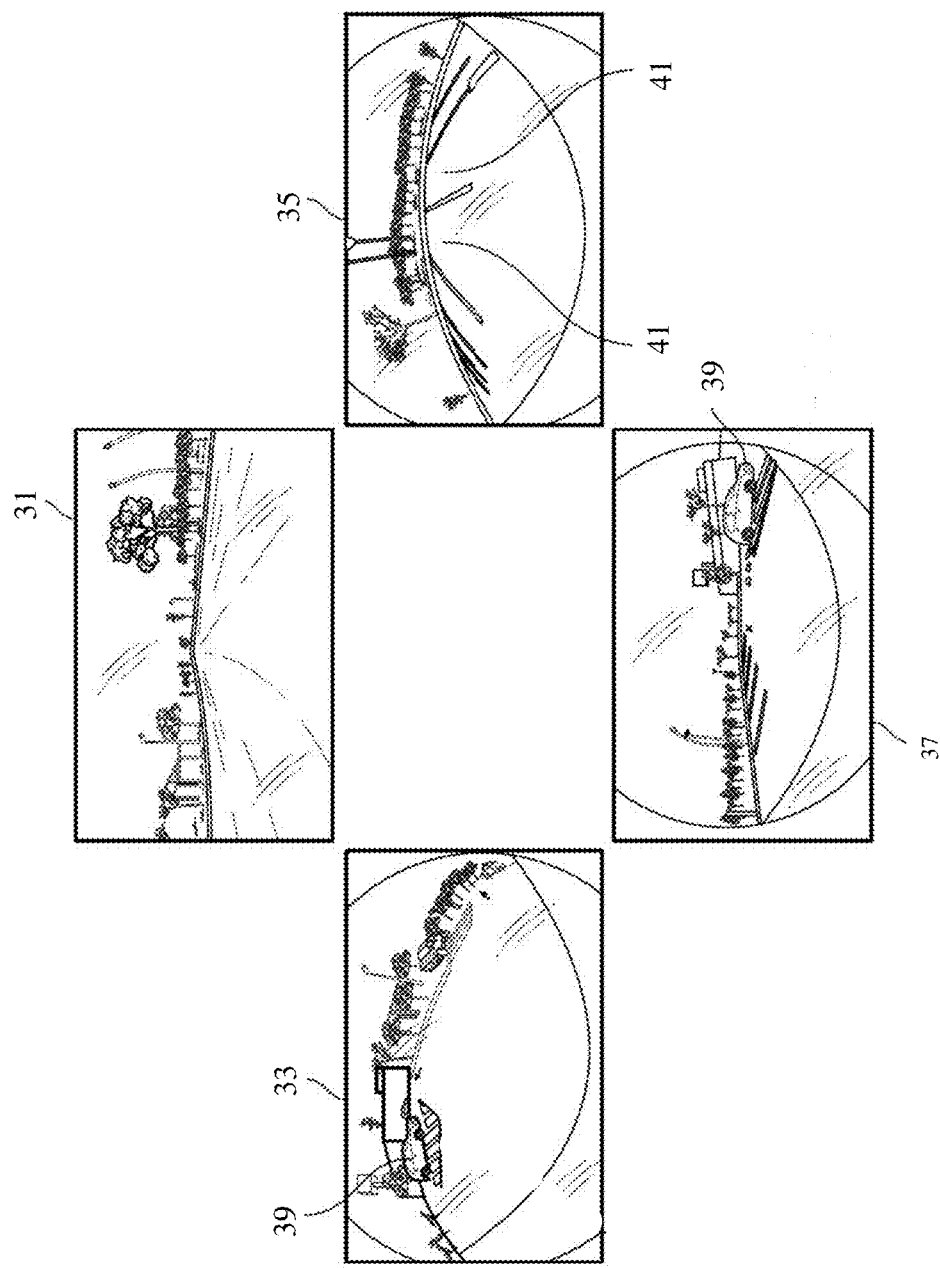
FIG. 2 shows images acquired from a plurality of cameras disposed on a vehicle in accordance with one or more embodiments.

FIG. 2 depicts an example of four image frames of an external environment of a vehicle 11, where each image frame is acquired using one of the four cameras 13 disposed on the vehicle 11 of FIG. 1. Because each image frame is associated with a given camera 13 disposed along the vehicle 11, the image frames may be described as a front image 31 (from the front-facing camera), a left image 33 (from the side-facing camera with the left-facing FOV), a right image 35 (from the side-facing camera with the right-facing FOV), and a rear image 37 (from the rear-facing camera). The example images have overlapping FOVs and form a surrounding camera view. The overlap of the FOVs is also shown in FIG. 2, as an additional vehicle 39 appears in both the left image 33 and the rear image 37 despite these images belonging to separate cameras 13.

In the example of FIG. 2, the images were acquired at an instance in time when the vehicle 11, on which the cameras 13 are disposed, was traversing through a parking lot. As seen in FIG. 2, the parking lot is outdoors and contains parking slots 41, where not all parking slots 41 are labeled for the sake of readability. The parking slots 41 of FIG. 2 are each marked with partially enclosed solid lines. In addition, the views are distorted, which represent images captured by a fish-eye lens that may be utilized by the plurality of cameras 13 in order to capture a broad view of the surrounding environment.

The images or video feed of the external environment captured by the plurality of cameras 13 are transmitted to the CPU 15 of the vehicle 11 to be processed. Returning to FIG. 1, the CPU 15 of the vehicle 11 may be formed of one or more processors, microprocessors, or equivalent computing structures. The images or image frames of video feeds acquired from the plurality of cameras 13 are combined by the CPU 15 to create an overhead representation, otherwise known as a "birds-eye view" (BEV), of the surrounding external environment of the vehicle 11. More specifically, the CPU 15 generates a hybrid BEV image (e.g., FIG. 3) formed by merging a first BEV image (e.g., FIG. 3) and a second BEV image (e.g., FIG. 3). The first BEV image includes dense information regarding features (e.g., additional vehicles 39, roadways, traffic signs, etc.) of the external environment at distances near to the vehicle 11. Conversely, the second BEV image includes less dense information of features of the external environment, but includes greater data regarding features at further distances than the first BEV image. In this way, the hybrid BEV image increases and improves the detection accuracy and range for both near and far features of the vehicle 11.

In one or more embodiments, the CPU 15 transmits the hybrid BEV image to other components of the vehicle 11, such as the dashboard 19. Accordingly, the hybrid BEV image may be displayed to a user of the vehicle 11 in order to improve the user's understanding of the external environment in relation to the vehicle 11.

Subsequent to generating a hybrid BEV image, the hybrid BEV image is processed to detect features of the external environment of the vehicle 11 by the CPU 15. Examples of features that may be identified include, but are not limited to, additional vehicles 39, roadways, roadway markings (e.g., lane markings, parking slot 41 lines, etc.) traffic signs, curbs, sidewalks, pedestrians, and forms of nature (e.g., trees, grass, bushes, etc.). Further, examples of processing the data include inputting the data into object detection algorithms such as a Single Shot Detection (SSD), Region-based Convolutional Neural Network (R-CNN), You Only Look Once (YOLO) Single Shot Detection, Fast R-CNN, Histogram of Oriented Gradients (HOG), or equivalent algorithms. As an output of the algorithm, the CPU 15 receives the identity of each detected feature, the location of each detected feature, and any text associated with each feature. For example, in the case of the vehicle 11 traversing through a parking lot, as in the example of FIG. 2, the CPU 15 of the vehicle 11 receives information that a number of vacant or occupied parking slots 41 are located in the visual vicinity of the vehicle 11.

In accordance with one or more embodiments, the CPU 15 further serves to assist the user of the vehicle 11 during an autonomous or semi-autonomous driving process. In one or more embodiments, the autonomous or semi-autonomous driving process may include an autonomous or semi-autonomous parking process. Accordingly, during an autonomous or semi-autonomous driving process, the CPU 15 may be employed to control the movements of the vehicle 11 for the user automatically or upon request of the user. Semi-autonomous driving is understood to mean, for example, that the CPU 15 of the vehicle 11 controls a steering apparatus and/or an automatic gear selection system, and relies upon a user monitoring the driving process. Fully autonomous driving is understood to mean, for example, that the CPU 15 controls the vehicle 11 without a user needing to monitor the process and/or be present during said process. Accordingly, the CPU 15 may control the steering, acceleration, braking, and any gear changes required by the vehicle 11 to travel to a desired destination of the user and/or park into or exit a parking slot 41.

In one or more embodiments, the vehicle 11 includes a navigational sensor 17 that receives a signal that includes global coordinates of the vehicle 11. The navigational sensor 17 may be a Global Positioning System (GPS) sensor, for example, or an equivalent sensor that determines the location of the vehicle 11 in relation to the external environment of the vehicle 11. The signal may also include information such as a direction and a velocity of the vehicle 11. In this case, the direction and velocity may be derived by comparing the global coordinates to their previous counterparts to determine the length of time that the vehicle 11 was traveling between two points. The signal may further include information associated with the coordinates themselves, such as, for example, which country the coordinates are located in. In addition, the coordinates may indicate a designated speed limit and/or a geometry of a roadway at the location of the coordinates, which may be utilized in the generation of a driving trajectory (e.g., FIG. 3) of the vehicle 11.

As such, the CPU 15 creates driving trajectories and/or parking trajectories for the vehicle 11 to follow and updates these driving trajectories and/or parking trajectories based on detected features of the external environment of the vehicle 11 determined from the constructed hybrid BEV images. Further, the updated driving trajectories and/or parking trajectories may be presented to a user of the vehicle 11 via the dashboard 19, which is a display such as a Liquid Crystal Display (LCD), an Organic Light-Emitting Diode (OLED) display, a quantum dot display, or equivalent display that is configured to present the user with information received from the CPU 15. The dashboard 19 further facilitates the collection of user input data, allowing the user to manually adjust or select driving trajectories and/or parameters thereof. In one or more embodiments, the driving trajectories and/or parking trajectories may be overlaid onto the constructed BEV images.

Figure 3:
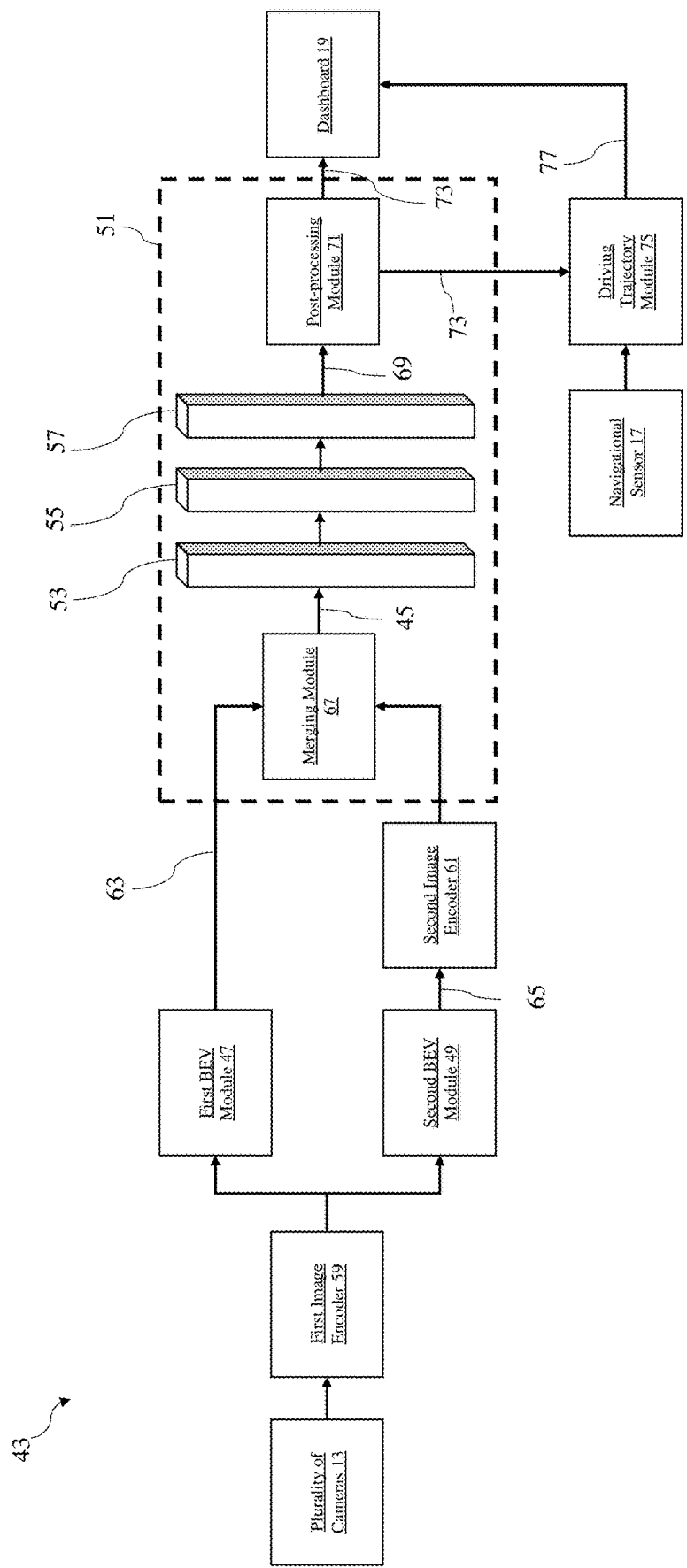
FIG. 3 shows a system in accordance with one or more embodiments disclosed herein.

FIG. 3 is a block diagram of a system 43 for generating a hybrid BEV image 45 in accordance with one or more embodiments disclosed herein. In one or more embodiments, the system 43 is associated with a vehicle 11. For example, one or more elements of the system 43 may be components of the vehicle 11, the system 43 may be utilized by a user of the vehicle 11 (e.g., a passenger and/or a driver), etc. Specific, nonlimiting scenarios are described below.

The system 43 includes a plurality of cameras 13, a CPU 15, and a dashboard 19. In one or more embodiments, the CPU 15 includes a first BEV module 47, a second BEV module 49, and a hybrid BEV engine 51. Functionally, the hybrid BEV engine 51 includes a deep learning neural network formed of an input layer 53, one or more hidden layers 55, and an output layer 57. Further, in one or more embodiments, the CPU 15 includes a first image encoder 59 and/or a second image encoder 61. Each of aforementioned components is subsequently described.

The plurality of cameras 13 are employed to capture data associated with the external environment surrounding the vehicle 11. In particular, the plurality cameras 13 may capture images or video feeds that each capture a portion of the external environment. Each video feed may be formed of a series of image frames of the external environment. Image frames may be captured repeatedly at a fixed or adjustable frame rate. The plurality of cameras 13 may have any field of view, resolution, orientation, etc. In one or more embodiments, the captured images or image frames from the plurality of cameras 13 may be provided in any format (e.g., representing RGB pixel values) and are received by the CPU 15 of the vehicle 11. As such, the CPU 15 may include components for a hardware-accelerated video processing, including machine learning-based video processing. In this vein, pre-processing such as cropping, brightness correction, contrast correction, compression, resizing, etc. may be performed by the CPU 15.

Alternatively, in one or more embodiments, the CPU 15 may receive the image frames captured by the plurality of cameras 13 as voltage or analog signals. In such embodiments, the CPU 15 includes a first image encoder 59 configured to convert the voltages of the image frames into a digital format. Subsequently, the first image encoder 59 may store the resulting digital images in various formats (e.g., RAW, PNG, JPEG, etc.) to be further processed by the first BEV module 47 and the second BEV module 49. The first BEV module 47 and the second BEV module 49 generate a first BEV image 63 and a second BEV image 65, respectively, from the image frames captured by the plurality of cameras 13 at a same point in time or "timestamp."

In one or more embodiments, the first BEV module 47 generates a first BEV image 63 from the captured images frames of a same timestamp with a sensor fusion process. This process is further described in relation to FIG. 4, which shows a flowchart 400 of a method of the first BEV module 47 for generating a first BEV image 63, in accordance with one or more embodiments disclosed herein.

Figure 4:
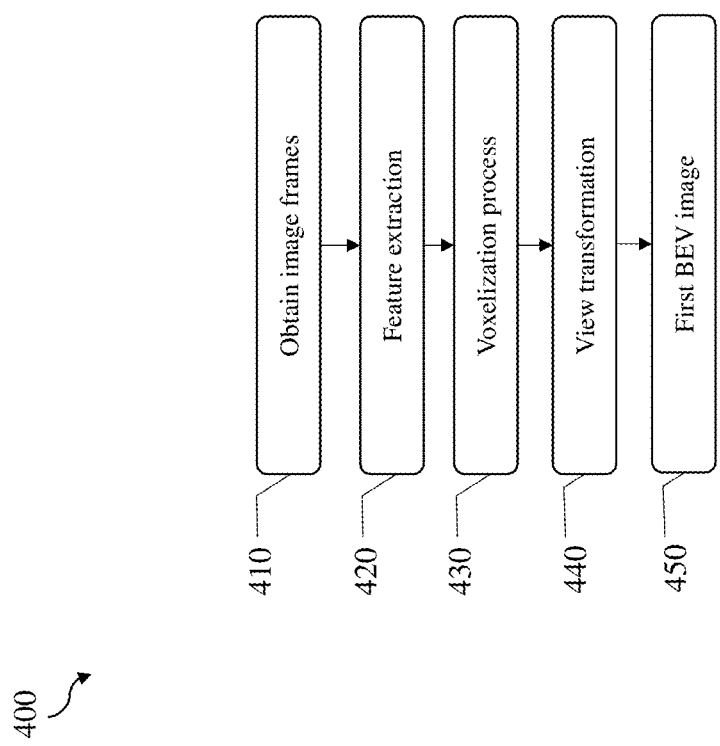
FIG. 4 shows a flowchart of a method in accordance with one or more embodiments disclosed herein.

Turning to FIG. 4, execution of one or more steps presented therein may involve one or more components of the system 43 as described in FIGS. 1-3. While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively. The operations implementing the described steps may be represented by electronically-readable instructions, such as software code, firmware code, etc., which may be stored on one more non-transitory computer readable medium.

In Step 410, the digital formats of image frames of a same timestamp are obtained by the first BEV module 47 from the first image encoder 59. This step involves, for example, transmitting the image frames via the bus 21 from the cameras 13 to the CPU 15. Alternatively, if the first image encoder 59 is included in the CPU 15 such that the CPU 15 receives voltage values from the cameras 13, then the step of obtaining the image frames with the first BEV module 47 includes accessing the location of the first image encoder 59 to obtain the image frames. In either case, step 410 is complete once the first BEV module 47 is in possession of the image frames.

In Step 420, a feature extraction process is performed upon each image frame. Specifically, one or more object detection algorithms are applied to each of the image frames obtained in Step 410 in order to identify features of the external environment of the vehicle 11 captured by the plurality of cameras 13 which can be used to characterize the current scene or environment. Examples of features that may be identified include, but are not limited to, additional vehicles 39, roadways, roadway markings (e.g., lane markings, parking slot 41 lines, etc.) traffic signs, curbs, sidewalks, pedestrians, and forms of nature (e.g., trees, grass, bushes, etc.).

In one or more embodiments, AI-based image processing is used for the identification of the features of the external environment. Example embodiments of deep learning-based image processing algorithms include, but are not limited to, OmniDet, Single Shot Detection (SSD), Region-based Convolutional Neural Network (R-CNN), You Only Look Once (YOLO) Single Shot Detection, Fast R-CNN, Histogram of Oriented Gradients (HOG), or equivalent algorithms, neural networks, and/or Machine Learning (ML) models. The resulting output of the deep learning-based image processing is a feature map for each processed image frame (i.e., a high-dimensional representation of each input image).

In Step 430, the extracted features, which may include semantic information or geometric attributes, are transformed from a two-dimensional space into a three-dimensional space. In one or more embodiments, this may be accomplished by a voxelization process. Generally, extracted features of images are mapped to corresponding voxels in a three-dimensional space during a voxelization process. Voxels represent a small volume element in the three-dimensional space and may be either empty or occupied by features. The voxelization process assigns occupancy values to each voxel of the three-dimensional space based on the presence or absence of features in the corresponding region of the three-dimensional space in the external environment. The size and resolution of the three-dimensional space is determined based on a desired level of detail and accuracy, and may be adjusted by a user or manufacturer of the vehicle 11 in one or more embodiments, may be adjusted.

Continuing with the voxelization process of step 430, each image frame is converted into a voxel representation. Subsequently, the voxel representations of the different image frames are combined to form a unified voxel representation of the scene captured by the image frames. This is typically accomplished by aligning the three-dimensional spaces of the image frames to ensure the corresponding voxels from different image frames represent the same region in space. Alignment of the three-dimensional spaces of the image frames may be accomplished by various techniques such as camera calibration, feature matching, utilizing known reference points in the scene, etc. Further, in one or more embodiments, visual odometry may be used to estimate the position and orientation of the plurality of cameras 13 at the timestamp in which the image frames were captured to aid in the alignment of the three-dimensional spaces. After alignment of the three-dimensional space, the voxel values from corresponding voxels in the different image frames are combined. The voxel values may be combined by averaging the voxel values, employing the maximum/minimum voxel value, or through the use of more sophisticated fusion algorithms.

In Step 440, a view transformation takes place in order to view the unified voxel representation, and thus, the extracted features of the processed images, in a single BEV representation. That is, the unified three-dimensional voxel representation of Step 430 is projected onto an overhead, two-dimensional plane. In particular, the voxels from the three-dimensional space are projected onto a projection plane by mapping each voxel to a corresponding pixel on the projection plane. As such, the position of each voxel in the three-dimensional space is transformed into a two-dimensional coordinate on the projection plane, considering the perspective and scale of the projection. In doing so, information is accumulated from multiple voxels that map to the same pixel on the projection plane.

In Step 450, the pixels of the projection plane may be assigned colors or textures based on the accumulated information from the mapped voxels. To this end, different colors or textures may be assigned to different features of the image. As a result, a first BEV image 63 is formed. Steps 410-450 may be performed in a loop, and the loop may be based on a fixed frame rate in order to form a continuously updating BEV image. This frame rate may correspond to the frame rate of the plurality of cameras 13, or it may be different depending on the vehicle 11 image processing capabilities.

Returning to FIG. 3, a second BEV image 65 is created by a second BEV module 49. It is noted that the second BEV module 49 is capable of keeping information of the captured image frames within the second BEV images 65 that is difficult for the first BEV module 47 to keep within the first BEV images 63. That is, it is not uncommon for details in the original, captured image frames to be missing in the respective first BEV image 63 due to the processes (i.e., the voxelization process of FIG. 4) employed by the first BEV module 47 to create the first BEV image 63. Typically, details or objects disposed within the external environment at a far distance from the vehicle 11 are missing from the respective first BEV image 63. However, the second BEV module 49 is successful in keeping features which are located at a far distance from the vehicle 11 in the external environment. Additionally, the second BEV module 49 advantageously retains features of nominal height (e.g., lane markings, parking slot 41 lines, etc.) within the second BEV images 65.

The second BEV module 49 generates a second BEV image 65 by converting the image frames acquired from the plurality of cameras 13 at a same timestamp into a single image. The single image has a desired overhead or BEV perspective, and is referred to herein as a second BEV image 65. As discussed further below, the second BEV image 65 is created by employing a technique commonly known as Inverse Perspective Mapping (IPM).

In one or more embodiments, prior to applying IPM, the second BEV module 49 performs a 2D/3D reprojection process to each raw image frame received by the second BEV module 49 in order to determine the value of each pixel with the image frames. During this process, the color of each pixel is determined based on the underlying geometry and shading techniques, which allows the geometry (i.e., shape, position, orientation, etc.) of an object within the raw image frame to be accounted for. Various algorithms, such as an edge function method, may be utilized to determine if a pixel of the image frame overlaps with a particular object or shape. Subsequently, a shading process assigns color values to pixels determined to overlap with an object. In some embodiments, this process may involve interpolating color values from the vertices of the object or applying lighting models to calculate a final color. As such, the determined color values are assigned to the corresponding pixels in the image frame. The intensity of each color may be represented by RGB values, and these intensities are combined to produce the final color of the pixels. In one or more embodiments, the resultant image frames are stored in a bitmap format.

Subsequently, the resulting image frames are transformed into an IPM image (i.e., the second BEV image 65). An overview of an IPM process is briefly presented as follows. First, the second BEV module 49 identifies any vanishing points in the distorted views of the image frames, using algorithms such as Random Sample Consensus (RANSAC), Hough transform, and/or Radon transform, by analyzing the orientation and convergence of lines present in the views. After identification of vanishing points, a homography transformation is applied to map each image frame from their original distorted perspective to the desired perspective. The homography transformation maps points from one perspective to another without changing straight lines, using algorithms such as Direct Linear Transform (DLT) and/or RANSAC. Subsequently, to enhance the visual quality of a transformed image frame and as part of post-processing, interpolation methods fill in any missing data from the transformed image frame, and smoothing methods reduce high-frequency noise in the transformed image frame to present a cleaner appearance of the transformed image frame. Interpolation methods include nearest-neighbor interpolation, bilinear interpolation, and bicubic interpolation, while smoothing methods include Gaussian smoothing, median filtering, and mean filtering. Additional adjustments can be made as desired to fine-tune parameters such as the angle of view and distortion correction.

Figure 5:
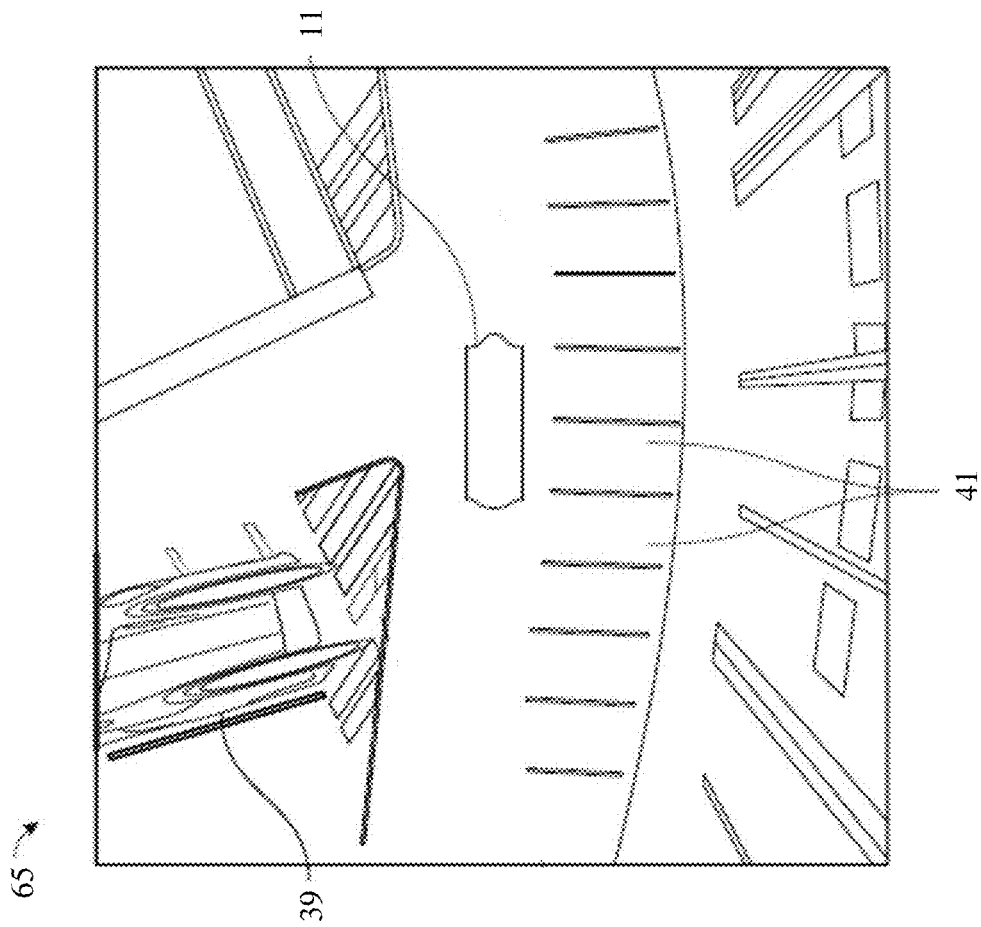
FIG. 5 shows an example BEV image in accordance with one or more embodiments.

FIG. 5 depicts an example second BEV image 65, constructed from the example image frames of FIG. 2. The example second BEV image 65 displays the surrounding environment of the vehicle 11 (i.e., the parking lot), including the parking slots 41, and the additional vehicle 39. It is noted that not every parking slot 41 is labeled in order to avoid cluttering the figure. As seen, IPM often causes distortion of non-planar objects. For example, the additional vehicle 39 appears stretched as if extending to a point at infinity in FIG. 5. However, the second BEV image 65 typically does not strongly influence the representation of the parking slots 41, and other planar objects, such that the second BEV image 65 can be used for identification and localization of objects and features of the external environment of the vehicle 11, such as parking slots 41.

Returning to FIG. 3, the second BEV image 65 may be post-processed by second image encoder 61 prior to the second BEV image 65 being merged with the first BEV image 63. As discussed herein, the second image encoder 61 converts the format of second BEV image 65 (e.g., bitmap to RAW) prior to the second BEV image 65 and the first BEV image 63 merging. Alternatively, the second image encoder 61 may be employed to further enhance or filter the second BEV image 65, compress the second BEV image 65 (e.g., in order for the second BEV image 65 to be of similar size as the first BEV image 63 of the same timestamp), and/or embed metadata into the second BEV image 65. Further, in one or more embodiments, the second image encoder 61 may be employed to convert the current color space (i.e., RGB) of the second BEV image 65 to a different color space (i.e., YUV, LAB, etc.) for compression, analysis, or specific application requirements.

In one or more embodiments, the hybrid BEV engine 51 includes a merging module 67, a deep learning neural network, and a post-processing module 71. Subsequent to the generation of a first BEV image 63 and a second BEV image 65 for a same timestamp, the merging module 67 receives the corresponding first BEV image 63 and second BEV image 65. Afterwards, the merging module 67 merges the corresponding first BEV image 63 and second BEV image 65 to form a single hybrid BEV image 45.

By way of example, the merging module 67 may utilize tensor concatenation to merge a first BEV image 63 and a second BEV image 65 into a hybrid BEV image 45. Specifically, the pixel values of the first BEV image 63 and the pixel values of the second BEV image 65 are combined during tensor concatenation to form a single tensor. First, the first BEV image 63 and the second BEV image 65 are converted into individual tensors with dimensions corresponding to the respective width, height, and color channels. Next, the two tensors representing the first BEV image 63 and the second BEV image 65 may be concatenated along a desired axis via a concatenation function of various frameworks or libraries in order to produce a single, merged tensor. Afterwards, the merged tensor may be converted into the desired image format for visualization or further processing. Alternatively, the merging module 67 may employ various processes to merge the corresponding first BEV image 63 and second BEV image 65 into a hybrid image, such as merging the images with a Feature Pyramid Network (FPN) or through a value addition process, for example.

Subsequent to the merging module 67 generating a hybrid BEV image 45, the hybrid BEV image 45 is then input into a deep learning neural network for object detection. In one or more embodiments, the deep learning neural network is a semantic feature-based deep learning neural network configured to determine and identify a location of the features within the hybrid BEV image 45. The semantic feature-based deep learning neural network is formed by an input layer 53, one or more hidden layers 55, and an output layer 57. The input layer 53 serves as an initial layer for the reception of the hybrid BEV image 45. The one or more hidden layers 55 includes layers such as convolution and pooling layers, which are further discussed below. The number of convolution layers and pooling layers of the hidden layers 55 depend upon the specific network architecture and the algorithms employed by the semantic feature-based deep learning neural network, as well as the number and type of features that the semantic feature-based deep learning neural network is configured to detect. For example, a neural network flexibly configured to detect multiple types of features will generally have more layers 53-57 than a neural network configured to detect a single feature. Thus, the specific structure of the layers 53-57, including the number of hidden layers 55, is determined by a developer of the hybrid BEV engine 51 and/or the system 43 as a whole.

In general, a convolution layer convolves the input hybrid BEV image 45 with learnable filters, extracting low-level features such as the outline of features and the color of features. Subsequent layers merge these features, forming higher-level representations that encode more complex patterns and textures associated with the features. Through training, the deep learning neural network refines weighted values associated with determining different types of features in order to recognize semantically relevant features for different classifications thereof. The final layers of the convolution operation employ the learned features to make predictions about the identity and location of the features.

On the other hand, the dimensions of outputs of the convolution layer are reduced into a down-sampled feature map by a pooling layer. For example, if the output of the convolution layer is a feature map with dimensions of 4 rows by 4 columns, the pooling layer may down-sample the feature map to have dimensions of 2 rows by 2 columns, where each cell of the down sampled feature map corresponds to 4 cells of the non-down sampled feature map produced by the convolution layer. The down-sampled feature map allows the feature extraction algorithms to pinpoint the general location of various objects detected with the convolution layer and filter. Continuing with the example provided above, an upper left cell of a 2×2 down-sampled feature map will correspond to a collection of 4 cells occupying the upper left corner of the feature map. This reduces the dimensionality of the inputs to the semantic feature-based deep learning neural network formed by the layers 53-57, such that an image including multiple pixels can be reduced to a single output of the location of a specific feature within the image.

In the context of the various embodiments described herein, a feature map may reflect the location of various physical objects present on a paved surface, such as the locations of lane markings and parking slot 41 lines. Subsequently, the feature map is converted by the hidden layer 55 into bounding boxes that are superimposed on the input image, or hybrid BEV image 45, to denote the location of various features identified by the feature map. In one or more embodiments, the feature locations may be stored in a look up table, and after storing the feature locations the annotated hybrid BEV image 69 is sent to the output layer 57. Accordingly, the output layer 57 outputs the annotated hybrid BEV image 69, which includes the determined semantic identity of the features detected in each captured image frame employed to generate the first BEV image 63 and the second BEV image 65. This process enables the deep learning model to discern features in images based on hierarchical extraction of semantic features learned from training data in two separate image branches (i.e., the first and second BEV modules), which further increases the robustness of the system 43.

After the features disposed in the external environment of the vehicle 11 are identified by the semantic feature-based deep learning neural network, the annotated hybrid BEV image 69 is input into a post-processing module 71. Each pixel of the annotated hybrid BEV image 69 associated with the same semantic class are grouped together, thereby creating a semantic mask (i.e., a silhouette of every feature present in the annotated hybrid BEV image 69). Semantic classes may include, but are not limited to, additional vehicles 39, roadway markings (e.g., lane markings, parking slot 41 lines, etc.) traffic signs, curbs, sidewalks, pedestrians, and flora (e.g., trees, grass, bushes, etc.).

Accordingly, in one or more embodiments, the deep learning neural network may apply image analysis methods such as semantic segmentation, instance segmentation, and/or bounding box detection. In one or more embodiments, the post-processing module 71 performs processes such as, but not limited to, semantic segmentation, instance segmentation, bounding box detection, vectorization, polygon detection, and polyline detection. During a vectorization process, the pixel-based annotations of the annotated hybrid BEV image 69 are converted to vector-based shapes for further analysis, manipulation, and/or more efficient storage of the annotated hybrid BEV image 69. During polygon detection and polyline detection, geometric shapes (i.e., polygons and polylines) are identified and extracted from the contours of the semantic masks of the annotated hybrid BEV image 69. Polygon detection and polyline detection techniques are often utilized to aid in shape recognition and boundary extraction. Furthermore, instance segmentation involves determining and separating individual objects in an image, while semantic segmentation involves assigning contextual labels to pixels of the image. On the other hand, bounding boxes are drawn around features in the external environment to present a visual denotation of the identified objects. These additional image analysis methods are applied to the annotated hybrid BEV image 69 to provide the user or an ADAS system (e.g., FIG. 7) of the vehicle 11 with a more complete representation of the external environment of the vehicle 11 and the identifiable features within the external environment.

In addition, in one or more embodiments, the post-processing module 71 may be in the form of a rendering engine configured to add augmented content to the annotated hybrid BEV image 69. Augmentation content includes objects to be added, modification of content in the image frame by masking, etc. Objects to be added include, for example, one or more items, symbols, labels, features, animated characters, text, etc. Each object may be static or dynamic. As such, in one or more embodiment, a virtual object (e.g., FIG. 6A), such as a virtual representation of the make and model of the vehicle 11, may be added to the annotated hybrid BEV image 69 in the position that the actual vehicle 11 would be located in the annotated hybrid BEV image 69 (e.g., FIG. 6A). That is, since the plurality of cameras 13 face outwardly from the vehicle 11 in some embodiments, the annotated hybrid BEV image 69 formed from the image frames captured by the plurality of cameras 13 often will not clearly depict the vehicle 11. Thus, a virtual object may be superimposed into the annotated hybrid BEV image 69 to represent the position of the vehicle 11 within the external environment.

Masks for modifying content in the image frame include overlays (e.g., color filters, blurring filters, etc.) that may be non-transparent or partially transparent, and may further be static or dynamic. A dynamic mask will vary in its depiction over time, by changing characteristics such as color and contrast for example. In one or more embodiments, masks may be added to the annotated hybrid BEV image 69 over detected features of the external environment. For example, a color filter may be applied to vacant parking slots 41 near the vehicle 11 in the annotated hybrid BEV image 69.

Subsequent to post processing, the annotated hybrid BEV image 69 is regarded as a processed hybrid BEV image 73. The processed hybrid BEV image 73 may then be sent to the dashboard 19 of the vehicle 11 for a user of the vehicle 11 to view in order to gain a greater understanding of the relationship of the vehicle 11 and the surrounding external environment. Alternatively, in one or more embodiments, the processed hybrid BEV image 73 may be sent to a driving trajectory module 75 prior to the dashboard 19.

In one or more embodiments, during the autonomous or semi-autonomous driving process of the vehicle 11, the CPU 15 utilizes received data associated with the external environment of the vehicle 11 from the plurality of cameras 13 of the vehicle 11 and navigational information from a navigational sensor 17 of the vehicle 11 in order to generate a driving trajectory 77 for the vehicle 11. The navigational sensor 17 of the system 43 is configured to receive coordinates indicating the position of the vehicle 11 and, in one or more embodiments, the designated speed limit and/or geometry of a roadway at the location of the coordinates, which may be utilized by the driving trajectory module 75 to aid in the generation of a driving trajectory 77 of the vehicle 11. Further, in one or more embodiments, in addition to the navigational information received from by the navigational sensor 17 of the system 43, the feature information stored within the processed hybrid BEV image 73 may be utilized by the driving trajectory module 75 to determine a driving trajectory 77 of the vehicle 11. Accordingly, the driving trajectory module 75 may utilize the positions, orientations, movements, etc. of the detected features of the external environment within the processed hybrid BEV image 73 in the determination of a driving trajectory 77 of the vehicle 11.

In one or more embodiments, a driving trajectory 77 of the vehicle 11 may be provided by interfacing with a mapping Application Programming Interface (API) belonging to a mapping entity. For example, a map trajectory may be generated by uploading the current position of the vehicle 11 and a destination location to an API belonging to the mapping entity (e.g., Google, Waze, Apple, etc.). The API returns one or more valid travel route(s) extending between the current position of the vehicle 11 and the destination location. The returned travel route(s) are subsequently presented to the user of the vehicle 11 as potential driving trajectories 77.

In one or more embodiments, in the case of a manned vehicle 11, the CPU 15 may present a plurality of driving trajectories 77 to a user of the vehicle 11 through the dashboard 19, permitting the user to select a desired driving trajectory 77. Accordingly, in one or more embodiments, the plurality of driving trajectories 77 may be presented to the driver over the processed hybrid BEV image 73. In this way, the user of the vehicle 11 may gain a greater understanding of the maneuvers the vehicle 11 is actively taking in relation to the external environment of the vehicle 11 and the features of the external environment. The plurality of driving trajectories 77 may differ in the number and type of maneuvers (i.e., forward, rearward, straight, curved, etc.), as well as an estimated time associated with each maneuver.

Figure 6C:
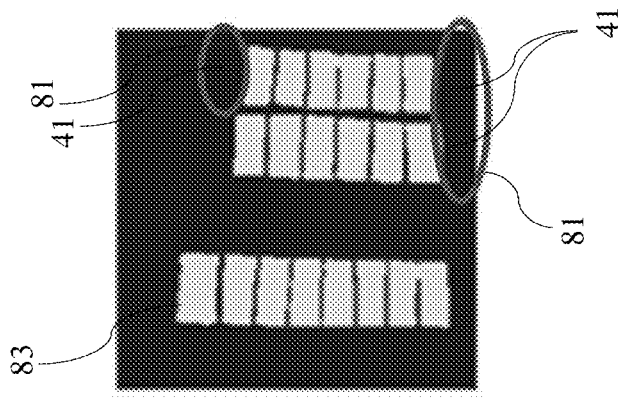
FIG. 6C shows an example of an object detection process in accordance with one or more embodiments disclosed herein performed solely on a first BEV image of the hybrid BEV image of FIG. 6A.
Figure 6B:
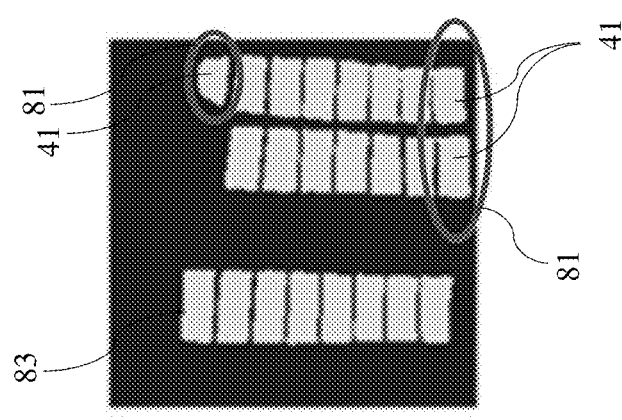
FIG. 6B shows an example of an object detection process in accordance with one or more embodiments disclosed herein performed on the hybrid BEV image of FIG. 6A.
Figure 6A:
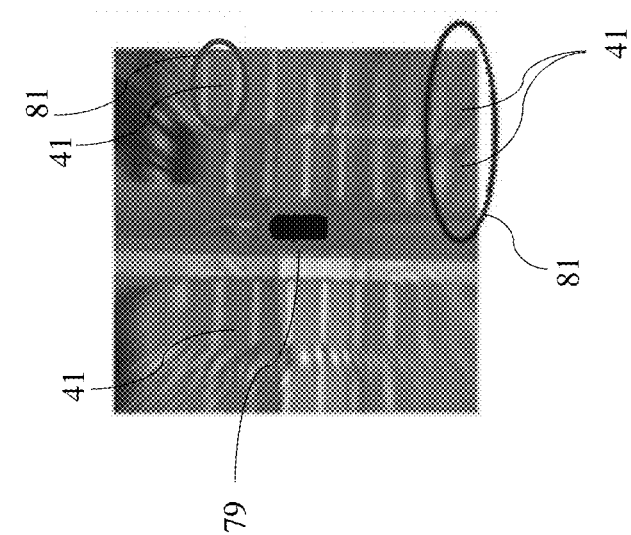
FIG. 6A shows an example of a hybrid BEV image in accordance with one or more embodiments disclosed herein.

FIGS. 6A-6C demonstrate the accuracy of an output of an object detection algorithm using a hybrid BEV image 45 compared to other input images. In FIG. 6A, an example of a hybrid BEV image 45 is depicted in accordance with one or more embodiments disclosed herein. Here, a vehicle 11 is traversing a parking lot and surrounded by several rows and columns of vacant parking slots 41, where not all parking slots 41 are labeled. While traversing through the parking lot, a plurality of cameras 13 of the vehicle 11 captures images of the external environment of the vehicle 11. These captured images are processed by the first BEV module 47 and the second BEV module 49 to form a first BEV image 63 and a second BEV image 65, respectively. The first BEV image 63 and the second BEV image 65 are subsequently merged into the hybrid BEV image 45 by the merging module 67.

In addition, the hybrid BEV image 45 of FIG. 6A includes a virtual object 79 representing the vehicle 11. The virtual object 79 has been overlaid onto the hybrid BEV image 45 to represent the position of the vehicle 11 within the external environment. Further, FIG. 6A, along with FIGS. 6B and 6C, includes ovals 81 to emphasize particular parking slots 41 of the external environment, and are discussed further with respect to FIG. 6C. The ovals 81 are included for illustrative purposes only, and are not drawn or otherwise produced by the CPU 15.

FIG. 6B shows an example of an output of an object detection algorithm using the hybrid BEV image 45 of FIG. 6A as input in accordance with one or more embodiments disclosed herein. In this example, the output of the object detection algorithm includes semantic masks 83 covering features of the external environment of the vehicle 11 identified within the hybrid BEV image 45. In this way, the parking slots 41 of the parking lot are represented by the semantic masks 83.

FIG. 6C shows an example of an output of the object detection algorithm which solely uses the first BEV image 63 (and not the second BEV image 65) as an input. As such, the output of the object detection algorithm of FIG. 6C includes semantic masks 83 covering the features of the external environment of the vehicle 11 identified within the first BEV image 63. However, as described above, when generating the first BEV image 63, it is very difficult to extract some details (e.g., features at a far distance, features with a nominal height, etc.) of the original image frames captured by the plurality of cameras 13 during the feature extraction step of the first BEV module 47. Thus, features associated with these missing details cannot be detected by object detection algorithms. For example, in FIG. 6C, the output of the object detection algorithm does not include three parking slots 41 which are at a far distance from the vehicle 11, and is missing three semantic masks 83 as a result. The ovals 81 superimposed on top of FIG. 6C indicate where the three missing parking slots 41 should be located, similar to the placement of the ovals 81 overlapping FIGS. 6A and 6B. As such, the output image of FIG. 6B advantageously has more detected objects than the output image of FIG. 6C, as the algorithms/processes used to create FIG. 6B rely on the use of the second BEV image 65.

Figure 7:
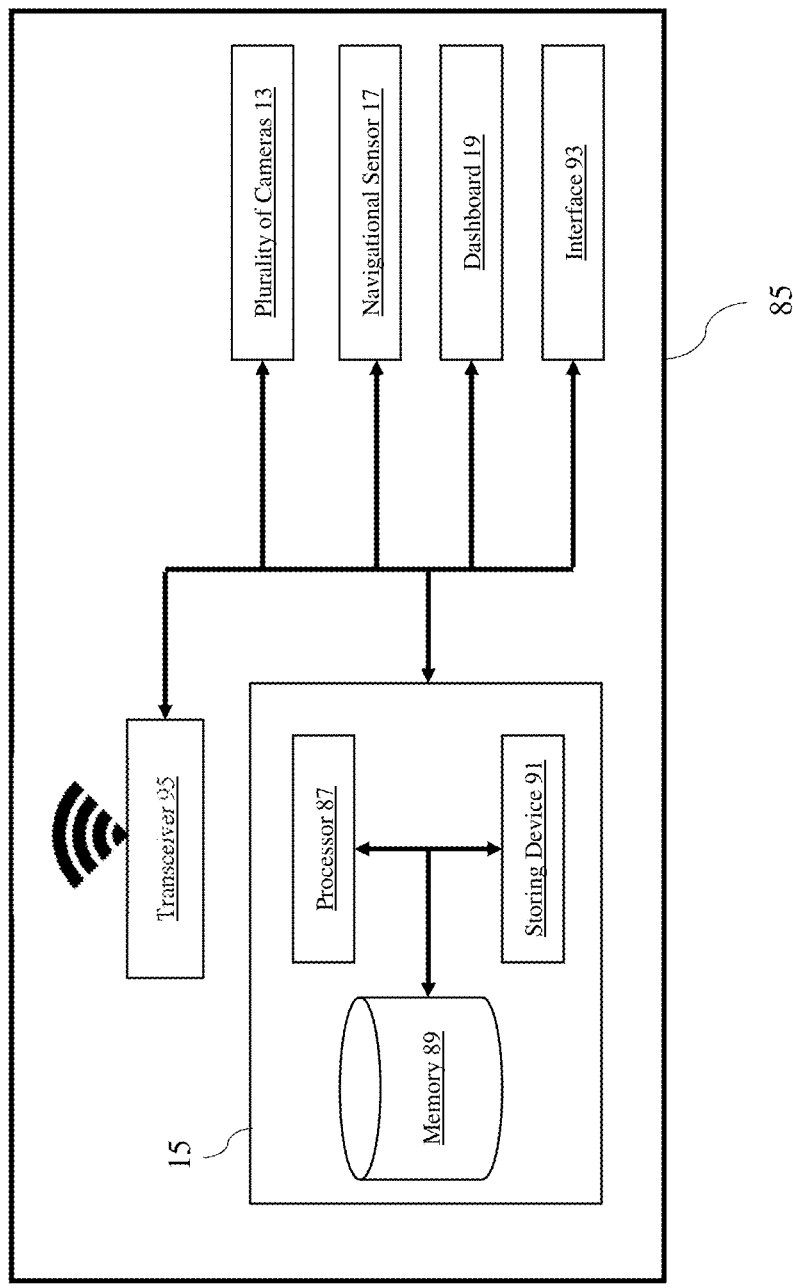
FIG. 7 shows a system in accordance with one or more embodiments disclosed herein.

FIG. 7 depicts a system overview of an Advanced Driver Assistance System (ADAS) 85 in accordance with one or more embodiments of the invention. The vehicle 11 includes a plurality of cameras 13 that collect data associated with the external environment of the vehicle 11 through images and/or video feeds. In one or more embodiments, the vehicle 11 includes one or more additional visual sensors (i.e., three dimensional or stereoscopic camera, radar unit, LiDAR unit, ultrasonic sensor, etc.) in order to aid in the accuracy of the hybrid BEV image 45 and formation of driving trajectories 77. Additionally, in one or more embodiments, the vehicle 11 includes a navigational sensor 17, which may be a GPS sensor as discussed above. The navigational sensor 17 is configured to receive coordinates indicating the position of the vehicle 11 and, in one or more embodiments, the designated speed limit and/or geometry of a roadway at the location of the coordinates. This information may be utilized in the generation of a driving trajectory 77 of the vehicle 11 by uploading the current vehicle 11 location and the destination of the vehicle 11 to a mapping API, as discussed above. The location of the vehicle 11 may be determined by the navigational sensor 17 using satellite-based triangulation or trilateration, for example, and the navigational sensor 17 may be connected to a database, server, stored memory, or network to receive the designated speed limit and the geometry of the roadway, as is commonly known in the art. Alternatively, the designated speed limit and the geometry of the roadway may be received from an external database or server, for example, or derived from information stored in the vehicle 11 itself.

Further, the vehicle 11 includes a CPU 15 that may be one or more mobile devices (e.g., laptop computer, smart phone, personal digital assistant, tablet computer, or other mobile device), desktop computers, servers, blades in a server chassis, one or more Electronic Control Units (ECUs) in a vehicle 11, or any other type of computing device or devices that includes at least the minimum processing power, memory, and input and output device(s) to perform one or more embodiments of the present disclosure. For example, as shown in FIG. 7, the CPU 15 may include one or more computer processors 87, associated memory 89, one or more storage device 91 (e.g., a hard disk, an optical drive such as a compact disk (CD) drive or digital versatile disk (DVD) drive, a flash memory stick, etc.), and numerous other elements and functionalities. The CPU 15 may be an integrated circuit for processing instructions. For example, the CPU 15 may be one or more cores, or micro-cores of a processor 87.

In addition, at least some operations of the ADAS 85 (e.g., first BEV module 47, second BEV module 49, hybrid BEV engine 51, etc.) may benefit from the availability of a graphics processing unit (GPU) (not shown) and may be performed thereby. Accordingly, the CPU 15 or another computing system may be equipped with a GPU that performs parallel processing operations that complement the CPU's linear processing capabilities. Further, while not explicitly shown, the operations performed by the various components discussed in reference to FIGS. 1-6 may be performed locally or remotely (e.g., in a server).

As described above, the images or video feeds of the external environment of the vehicle 11 captured by the plurality of cameras 13 are transmitted to the CPU 15. In one or more embodiments, the data is transmitted to the memory 89 of the CPU 15 wirelessly or by way of a bus 21, which is formed of wires, wiring harnesses, circuit boards, or equivalent means to interconnect the various components of the vehicle 11. The memory 89 is a non-transitory storage medium such as flash memory, cache memory, Random Access Memory (RAM), a Hard Disk Drive (HDD), a Solid State Drive (SSD), a combination thereof, or equivalent medium that holds data for the CPU 15 or other components (or a combination of both). In addition to storing the captured data, the memory 89 also stores trigonometric functions, dimensions of the vehicle 11, inputs, outputs, functions, and processes necessary to perform feature extraction, localization, path planning, autonomous maneuvering of the vehicle 11, user interaction(s) (e.g., via an interface and/or dashboard 19), and other functions and processes described herein. Although illustrated as a single memory 89 in FIG. 7, two or more memories 89 may be employed according to particular needs, desires, or particular implementations of the CPU 15 and the described functionality. Further, while the memory 89 is illustrated as an integral component of the CPU 15, in alternative implementations, the memory 89 may be external to the CPU 15.

The ADAS 85 further includes an interface 93 and a dashboard 19 in order to transmit information to a user of the vehicle 11. The dashboard 19 may be a Liquid Crystal Display (LCD), Organic Light-Emitting Diode (OLED), or equivalent display, while the interface may be one or more buttons, dials, or a touchscreen that allows a user to interact with the vehicle 11. The dashboard 19 displays information such as the hybrid BEV image 45 of the external environment of the vehicle 11, driving trajectories 77, and parking trajectories to a user, which allows the user to see and/or select the maneuvers taken by the vehicle 11 in order to complete a driving process or a parking process. On the other hand, the interface 93 allows a user to select convenience features such as a unit for measuring the speed limit (such as Miles Per Hour (MPH) or Kilometers Per Hour (KPH)). The interface 93 may also be used to allow the user to manually identify and/or select an unoccupied parking slot 41 for a parking process.

In one or more embodiments, the ADAS 85 includes a transceiver 95, which wirelessly transmits and receives signals to and from the vehicle 11. Example embodiments of the transceiver 95 include an antenna (not shown) and processor (not shown) that transmit and receive radar, radio, cellular, satellite, Wi-Fi, Bluetooth, Wi-Max, or other equivalent signals. The transceiver 95 may be used to connect the CPU 15 to a server (not shown) in order to access a number of databases. Further, the transceiver 95 may be used to receive navigational information regarding a current or upcoming roadway. In addition, the transceiver 95 may transmit information about the current roadway, unoccupied parking slots 41, and occupied parking slots 41 to a server or surrounding vehicles.

Figure 8:
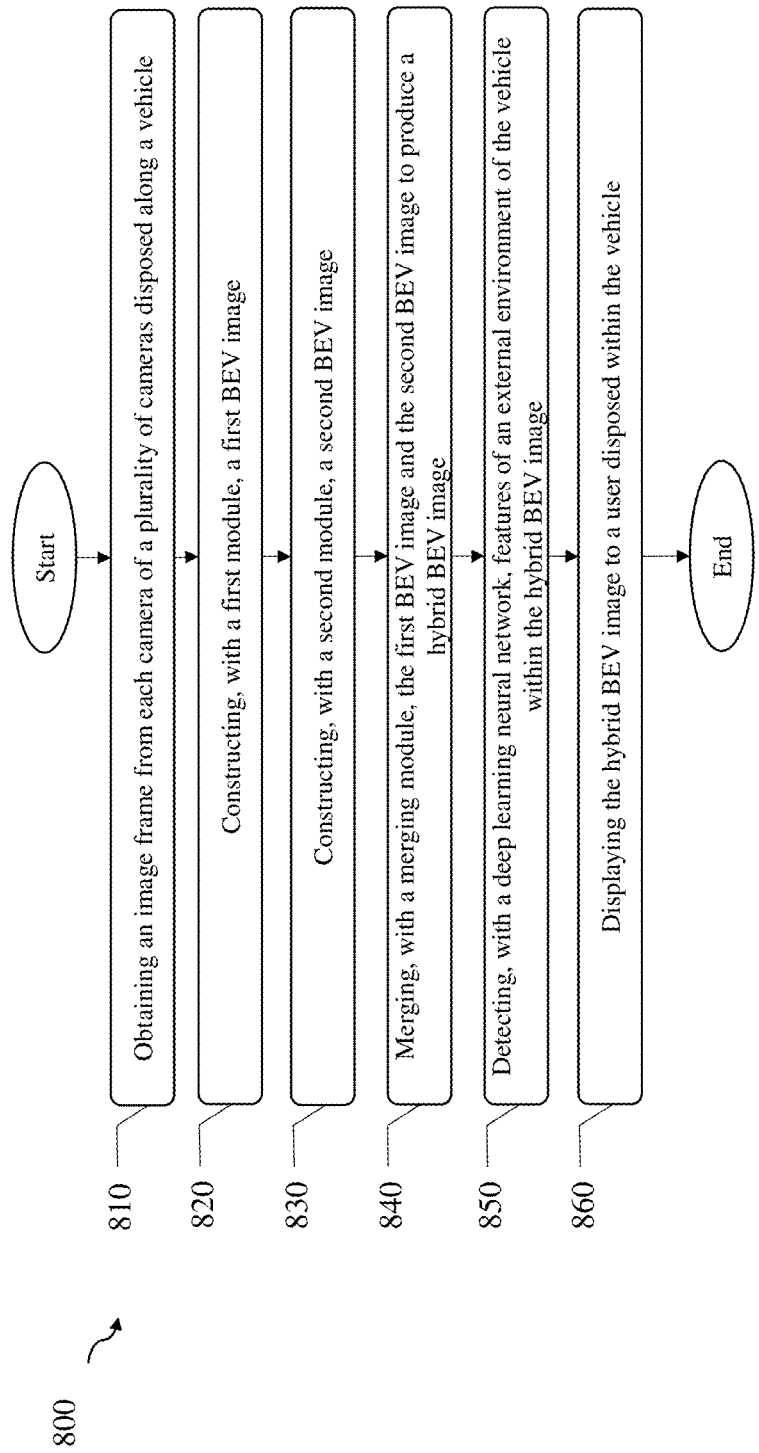
FIG. 8 shows a flowchart of a method in accordance with one or more embodiments disclosed herein.

FIG. 8 depicts a flowchart 800 of a method for generating a hybrid BEV image 45 in accordance with one or more embodiments disclosed herein. Steps of the flowchart shown in FIG. 8 may be performed by an ADAS 85 as described herein but are not limited thereto. The constituent steps of the method depicted in FIG. 8 may be performed in any logical order, and the method is not limited to the sequence presented.

As depicted in FIG. 8, the method initiates at Step 810, which includes a CPU 15 obtaining an image frame from each camera of a plurality of cameras 13 disposed along a vehicle 11. The plurality of cameras 13 are employed to capture data associated with the external environment surrounding the vehicle 11. Image frames may be captured repeatedly at a fixed or adjustable frame rate. The plurality of cameras 13 may have any FOV, resolution, orientation, etc. without departing from the nature of this disclosure.

In one or more embodiments, the CPU 15 receives the image frames captured by the plurality of cameras 13 as voltage or analog signals. As such, in one or more embodiments, the CPU 15 includes a first image encoder 59 configured to convert the voltages of the image frames into a digital format. Subsequently, the first image encoder 59 may store the resulting digital images in various formats (e.g., RAW, PNG, JPEG, etc.) to be further processed as discussed below.

In Step 820, a first BEV module 47 generates a first BEV image 63 from the digital formats of image frames of a same timestamp obtained from the first image encoder 59. Next, a feature extraction process is performed on each image frame. Specifically, one or more object detection algorithms are applied to each of the image frames in order to identify features of the external environment of the vehicle 11 captured by the plurality of cameras 13 which can be used to characterize the current scene or environment. Next, the extracted features of an image frame, which may include semantic information or geometric attributes, are transformed from a two-dimensional space into a three-dimensional space by a voxelization process. During a voxelization process, the three-dimensional representations of each image frame are combined to form a single, unified three-dimensional representation of the entire scene captured by the plurality of cameras. Subsequently, a view transformation takes place in order to view the unified three-dimensional representation, and thus, the extracted features of the processed images, in a single BEV representation. In one or more embodiments, a unified three-dimensional voxel-based representation is projected onto an overhead, two-dimensional plane. The pixels of the projection plane may be assigned colors or textures based on the accumulated information from the mapped voxels. To this end, different colors or textures may be assigned to different features of the image. Resultingly, a first BEV image 63 is formed.

In Step 830, a second BEV image 65 is created by a second BEV module 49. The second BEV module 49 generates a second BEV image 65 by converting the image frames acquired from the plurality of cameras 13 at a same timestamp into a single image which has a desired overhead or BEV perspective by way of IPM. In one or more embodiments, prior to applying IPM, the second BEV module 49 performs a 2D/3D reprojection process to each raw image frame received by the second BEV module 49 in order to determine the value of each pixel with the image frames. Subsequently, in one or more embodiments, the resulting image frames are stored in a bitmap format.

After the second BEV module 49 generates a second BEV image 65 from the IPM image frames, second BEV image 65 may be post-processed by a second image encoder 61. In one or more embodiments, the second image encoder 61 may convert the format of second BEV image 65 (e.g., bitmap to RAW) prior to the second BEV image 65 and the first BEV image 63 merging. Alternatively, the second image encoder 61 may be employed to further enhance or filter the second BEV image 65, compress the second BEV image 65 (e.g., in order for the second BEV image 65 to be of similar size as the first BEV image 63 of the same timestamp), and/or embed metadata into the second BEV image 65. Further, in one or more embodiments, the second image encoder 61 may be employed to convert the current color space (i.e., RGB) of the second BEV image 65 to a different color space (i.e., YUV, LAB, etc.) for compression, analysis, or specific application requirements.

In Step 840, a merging module 67 of a hybrid BEV engine 51 receives the corresponding first BEV image 63 and second BEV image 65. To this end, the merging module 67 merges the corresponding first BEV image 63 and second BEV image 65 to form a single hybrid BEV image 45. In one or more embodiments, the merging module 67 may utilize a value addition process, a tensor concatenation process, or utilize an FPN to merge a first BEV image 63 and a second BEV image 65 into a hybrid BEV image 45.

In Step 850, the hybrid BEV image 45 is input into a deep learning neural network for object detection. In one or more embodiments, the deep learning neural network is a semantic feature-based deep learning neural network configured to determine and identify a location of the features within the hybrid BEV image 45. The semantic feature-based deep learning neural network is formed by an input layer 53, one or more hidden layers 55, and an output layer 57. As such, the neural network (i.e., layers 53-57) extracts various features from the hybrid BEV image 45 and associates each identified feature with its positional information in a look up table. The output layer 57 outputs an annotated hybrid BEV image 69 that includes the determined semantic identity of the features detected in each captured image frame employed to generate the first BEV image 63 and the second BEV image 65. Accordingly, the deep learning neural network may apply image analysis methods such as semantic segmentation, instance segmentation, and/or bounding box detection.

In one or more embodiments, after the features disposed in the external environment of the vehicle 11 are identified by the semantic feature-based deep learning neural network, the annotated hybrid BEV image 69 is input into a post-processing module 71. In one or more embodiments, the post-processing module 71 applies further image analysis methods to the annotated hybrid BEV image 69, such as vectorization, polygon detection, polyline detection, semantic segmentation, instance segmentation, bounding box detection, etc.

In one or more embodiments, the post-processing module 71 may include a rendering engine that adds augmented content to the annotated hybrid BEV image 69. Augmentation content includes objects to be added, modification of content in the image frame by masking, and similar concepts. Objects to be added include, for example, one or more items, symbols, labels, features, animated characters, text, etc. Each object may be static or dynamic. Masks for modifying content in the image frame include overlays (e.g., color filters, blurring filters, etc.), which may be non-transparent or partially transparent and may further be static or dynamic. In one or more embodiments, masks may be added to the annotated hybrid BEV image 69 over detected features of the external environment.

In Step 860, the hybrid BEV image 45, or processed hybrid BEV image 73, is sent to the dashboard 19 of the vehicle 11 for a user of the vehicle 11 to view in order to gain a greater understanding of the relationship of the vehicle 11 and the surrounding external environment.

Alternatively, in one or more embodiments, the processed hybrid BEV image 73 may be sent to a driving trajectory module 75 prior to the dashboard 19. In one or more embodiments, in addition to the navigational information received from by a navigational sensor 17 of the system 43, the feature information stored within the processed hybrid BEV image 73 may be utilized by the driving trajectory module 75 to determine a driving trajectory 77 of the vehicle 11 for autonomous or semi-autonomous driving processes of the vehicle 11. Accordingly, the driving trajectory module 75 may utilize the positions, orientations, movements, etc. of the detected features of the external environment within processed hybrid BEV image 73 in the determination of a driving trajectory 77 of the vehicle 11. As such, the CPU 15 may present a plurality of driving trajectories 77 to a user of the vehicle 11 through the dashboard 19, permitting the user to select a desired driving trajectory 77.

Subsequent to the hybrid BEV image 45 being displayed upon the dashboard 19 of the vehicle 11, the method may restart at Step 810. In this way, the hybrid BEV image 45 displayed upon the dashboard 19 may be updated as the plurality of cameras 13 capture additional image frames. Specifically, as time progresses newly captured image frames are obtained and utilized by the first BEV module 47 and the second BEV module 49 to construct additional first BEV images 63 and additional second BEV images 65, respectively. The merging module 67 may then merge the additional first BEV images 63 and the additional second BEV images 65 in order to form additional or new hybrid BEV images 45 that replace previous BEV images 45. The creation and display of new hybrid BEV images 45 may be based on a fixed frame rate. This frame rate may correspond to the frame rate of the plurality of cameras 13, or it may be different.

In one or more embodiments, the driving trajectory 77 of the vehicle 11 may be updated based on the newly acquired feature information located within the new hybrid BEV images 45. Further, in one or more embodiments, the post-processing module 71 may track the positions, orientations, movements, etc. of the detected features of the external environment within between each additional new hybrid BEV image 45. In this way, the driving trajectory 77 of the vehicle 11 may be updated based on the tracked positions, orientations, movements, etc. of the detected features.

Accordingly, embodiments disclosed herein relate to systems 43 and methods useful for generating a hybrid BEV image 45. Advantageously, the disclosed systems 43 and methods increase the detection range of BEV images and improve the accuracy for objects located at far distances within the images. In addition, the disclosed systems 43 and methods efficiently detect features of an external environment with a nominal height such as parking slots 41 and lane markings.

While only a few example embodiments have been described in detail above, those skilled in the art will readily appreciate that many modifications are possible in the example embodiments without materially departing from the invention. For example, the first BEV module 47, the second BEV module 49, the hybrid BEV engine 51, and the driving trajectory module 75 may be hosted on either a server and/or the CPU 15 of the vehicle 11. Further, the vehicle 11 may be outfitted with additional sensory systems to aid in the generation of a hybrid BEV image 45. These sensory systems may include a three dimensional or stereoscopic camera, a radar unit, a LiDAR unit, an ultrasonic sensor, or an equivalent sensor configured to capture a spatial representation of the external environment of the vehicle 11. Accordingly, all such modifications are intended to be included within the scope of this disclosure as defined in the following claims.

What is claimed is:

1. A method, comprising:
   obtaining an image frame from each camera of a plurality of cameras disposed along a vehicle, each image frame corresponding to a same timestamp;
   constructing, with a first birds-eye view (BEV) module, a first BEV image from each image frame, the first BEV module being configured to:
     extract features of an external environment of the vehicle from each image frame;
     transform the features extracted from a two-dimensional space to a three-dimensional space; and
     perform a view transformation by projecting the three-dimensional space onto an overhead, two-dimensional plane;
   constructing, with a second BEV module, a second BEV image from each image frame by Inverse Perspective Mapping (IPM);
   merging, with a merging module, the first BEV image and the second BEV image to produce a hybrid BEV image;
   detecting, with a deep learning neural network, the features of the external environment of the vehicle within the hybrid BEV image; and
   displaying the hybrid BEV image to a user disposed within the vehicle.

2. The method of claim 1, further comprising: transforming, by the second BEV module, the image frames from a raw format to a bitmap format prior to the constructing the second BEV image.

3. The method of claim 1, further comprising: post-processing the hybrid BEV image by performing at least one of the following tasks:
vectorization;
polygon detection;
polyline detection;
semantic segmentation;
instance segmentation; and
bounding box detection.

4. The method of claim 1, wherein the merging the first BEV image and the second BEV image comprises a value addition process, a tensor concatenation process, or processing the first BEV image and the second BEV image through a Feature Pyramid Network (FPN) to produce the hybrid BEV image.

5. The method of claim 1, wherein the hybrid BEV image is updated by replacing the hybrid BEV image with a new hybrid BEV image formed by the merging module by merging an additional first BEV image and an additional second BEV image created by the first BEV module and the second BEV module, respectively, as the plurality of cameras capture new image frames.

6. The method of claim 1, further comprising: determining, by a driving trajectory module, a trajectory of an autonomous driving process or a semi-autonomous driving process of the vehicle, wherein the trajectory is determined based on the features of the external environment of the vehicle detected within the hybrid BEV image and navigational information received by a navigational sensor of the vehicle.

7. The method of claim 6, further comprising: displaying the trajectory of the autonomous driving process or the semi-autonomous driving process of the vehicle to the user and receiving input from the user facilitating manual adjustment or selection of the trajectory via a dashboard of the vehicle, wherein the trajectory is overlaid onto the hybrid BEV image.

8. The method of claim 6, wherein the trajectory of the autonomous driving process or the semi-autonomous driving process of the vehicle is updated as the hybrid BEV image is updated, wherein the hybrid BEV image is updated by replacing the hybrid BEV image with a new hybrid BEV image formed by the merging module by merging an additional first BEV image and an additional second BEV image created by the first BEV module and the second BEV module, respectively, as the plurality of cameras capture new image frames.

9. The method of claim 8, further comprising: tracking, by a post-processing module, positions, orientations, and movements of the detected features of the external environment of the vehicle as the hybrid BEV image is updated, wherein the trajectory of the autonomous driving process or the semi-autonomous driving process of the vehicle is updated based on the tracked positions, orientations, and movements of the detected features.

10. The method of claim 1, further comprising: adding augmented content to the hybrid BEV image by a post-processing module.

11. A non-transitory computer readable medium storing instructions executable by one or more processors of a Central Processing Unit (CPU), the instructions comprising functionality for:
obtaining an image frame from each camera of a plurality of cameras disposed along a vehicle, each image frame corresponding to a same timestamp;
constructing, with a first birds-eye view (BEV) module, a first BEV image from each image frame, the first BEV module being configured to:
extract features of an external environment of the vehicle from each image frame;
transform the features extracted from a two-dimensional space to a three-dimensional space; and
perform a view transformation by projecting the three-dimensional space onto an overhead, two-dimensional plane;
constructing, with a second BEV module, a second BEV image from each image frame by Inverse Perspective Mapping (IPM);
merging, with a merging module, the first BEV image and the second BEV image to produce a hybrid BEV image;
detecting, with a deep learning neural network, features of an external environment of the vehicle within the hybrid BEV image; and
displaying the hybrid BEV image to a user disposed within the vehicle.

12. A system, comprising:
a vehicle;
a plurality of cameras disposed along the vehicle;
a deep learning neural network; and
a Central Processing Unit (CPU) comprising:
one or more computer processors; and
a non-transitory computer readable medium storing instructions executable by the one or more processors, the instructions comprising functionality for:
obtaining an image frame from each camera of the plurality of cameras corresponding to a same timestamp;
constructing, with a first birds-eye view (BEV) module, a first BEV image from each image frame, the first BEV module being configured to:
extract features of an external environment of the vehicle from each image frame;
transform the features extracted from a two-dimensional space to a three-dimensional space; and
perform a view transformation by projecting the three-dimensional space onto an overhead, two-dimensional plane;
constructing, with a second BEV module, a second BEV image from each image frame by Inverse Perspective Mapping (IPM);
merging, with a merging module, the first BEV image and the second BEV image to produce a hybrid BEV image;
detecting, with the deep learning neural network, features of an external environment of the vehicle within the hybrid BEV image; and
displaying, via a dashboard of the vehicle, the hybrid BEV image to a user disposed within the vehicle.

13. The system of claim 12, wherein the second BEV module is configured to transform the image frames from a raw format to a bitmap format prior to constructing the second BEV image.

14. The system of claim 12, wherein the merging module is configured to merge the first BEV image and the second BEV image by a value addition process, a tensor concatenation process, or processing the first BEV image and the second BEV image through a Feature Pyramid Network (FPN) to produce the hybrid BEV image.

15. The system of claim 12, wherein the hybrid BEV image is updated by replacing the hybrid BEV image with a new hybrid BEV image formed by the merging module by merging an additional first BEV image and an additional second BEV image created by the first BEV module and the second BEV module, respectively, as the plurality of cameras capture new image frames.

16. The system of claim 12, wherein the CPU is further configured to determine, by a driving trajectory module, a trajectory of an autonomous driving process or a semi-autonomous driving process of the vehicle, wherein the trajectory is determined based on the features of the external environment of the vehicle detected within the hybrid BEV image and navigational information received by a navigational sensor of the vehicle.

17. The system of claim 16, wherein the trajectory of the autonomous driving process or the semi-autonomous driving process of the vehicle is overlaid onto the hybrid BEV image and displayed to the user via the dashboard, wherein the dashboard is further configured to receive input from the user facilitating manual adjustment or selection of the trajectory.

18. The system of claim 16, wherein the trajectory of the autonomous driving process or the semi-autonomous driving process of the vehicle is updated as the hybrid BEV image is updated, wherein the hybrid BEV image is updated by replacing the hybrid BEV image with a new hybrid BEV image formed by the merging module by merging an additional first BEV image and an additional second BEV image created by the first BEV module and the second BEV module, respectively, as the plurality of cameras capture new image frames.

19. The system of claim 18, wherein the CPU is further configured to track, by a post-processing module, positions, orientations, and movements of the detected features of the external environment of the vehicle as the hybrid BEV image is updated, wherein the trajectory of the autonomous driving process or the semi-autonomous driving process of the vehicle is updated based on the tracked positions, orientations, and movements of the detected features.

20. The system of claim 12, wherein augmented content is added to the hybrid BEV image by a post-processing module.

\* \* \* \* \*